US008050021B2

(12) United States Patent
Grady et al.

(10) Patent No.: US 8,050,021 B2
(45) Date of Patent: Nov. 1, 2011

(54) EJECTABLE/RETRACTABLE INTERFACE MODULE FOR A COMPUTER SYSTEM

(75) Inventors: John R. Grady, Cypress, TX (US); Everett R. Salinas, Pasadena, TX (US); Billy E. Buller, Jr., Addison, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 759 days.

(21) Appl. No.: 12/122,519

(22) Filed: May 16, 2008

(65) Prior Publication Data

US 2008/0303391 A1 Dec. 11, 2008

Related U.S. Application Data

(60) Provisional application No. 60/943,204, filed on Jun. 11, 2007.

(51) Int. Cl.
G06F 1/16 (2006.01)

(52) U.S. Cl. ............. 361/679.21; 312/223.3; 211/26

(58) Field of Classification Search ............. 361/679.21; 312/223.3; 211/26
See application file for complete search history.

(56) References Cited

U.S. PATENT DOCUMENTS

| 6,152,550 | A | * | 11/2000 | Yamaguchi | ................ 312/223.2 |
|---|---|---|---|---|---|
| 6,175,502 | B1 | | 1/2001 | Schaerer | |
| 6,185,092 | B1 | | 2/2001 | Landrum | |
| 6,201,690 | B1 | | 3/2001 | Moore | |
| 6,353,532 | B1 | | 3/2002 | Landrum | |
| 6,469,802 | B1 | * | 10/2002 | Yamaguchi | ................ 358/1.8 |
| 6,520,346 | B1 | * | 2/2003 | Liu | ................ 211/26 |
| 6,563,700 | B1 | | 5/2003 | Waller | |
| 6,778,381 | B1 | | 8/2004 | Bolognia | |
| 6,816,177 | B2 | | 11/2004 | Wang | |
| 6,827,409 | B2 | * | 12/2004 | Michael | ................ 312/223.3 |
| 6,945,412 | B2 | | 9/2005 | Felcman | |
| 6,956,735 | B2 | | 10/2005 | Lee | |
| 6,984,007 | B2 | | 1/2006 | Tobishima | |
| 7,088,589 | B2 | | 8/2006 | Chen | |
| 7,209,347 | B2 | | 4/2007 | Liang | |
| 7,258,568 | B2 | * | 8/2007 | Shih | ................ 439/377 |
| 7,755,904 | B2 | * | 7/2010 | Wu et al. | ................ 361/727 |
| 2005/0264983 | A1 | | 12/2005 | Chen | |
| 2006/0232917 | A1 | | 10/2006 | Wu | |
| 2007/0030647 | A1 | * | 2/2007 | Chen et al. | ................ 361/687 |
| 2008/0023416 | A1 | * | 1/2008 | Huang | ................ 211/26 |
| 2008/0180898 | A1 | * | 7/2008 | Henderson | ................ 361/683 |

FOREIGN PATENT DOCUMENTS

JP 11282372 10/1999

* cited by examiner

*Primary Examiner* — Lisa Lea Edmonds

(57) ABSTRACT

An ejectable/retractable interface module is disclosed. AN exemplary interface module may include a display trolley assembly, and a display module pivotally connected to the display trolley assembly. A management cable connects the display module to a computer board in the display trolley assembly. The display trolley assembly and display module are configured for during ejection and retraction in a blade enclosure so that the display module folds flat and retracts into the blade enclosure to reduce damage during shipping. The display module pivots to a desired viewing angle during use.

19 Claims, 11 Drawing Sheets

Detail A

DETAIL A

EJECTABLE/RETRACTABLE INTERFACE MODULE FOR A COMPUTER SYSTEM

PRIORITY APPLICATION

This application claims priority to co-owned U.S. Provisional Patent Application Ser. No. 60/943,204 filed Jun. 11, 2007 and hereby incorporated by reference as though fully set forth herein.

BACKGROUND

Rack systems are widely available in a variety of different sizes and configurations. In general, rack systems enable high-density computer systems in which processing units, storage units, and other peripheral devices are provided as modules (also referred to as "blade enclosures") that can be readily added, removed, replaced, or upgraded without having to replace the entire computer system.

Often, these rack systems are provided with separate interface modules (e.g., display and/or keypad devices), and due to space constraints the interface modules are typically connected to the rack system in front of the blade enclosures so as not to waste any space. As the density of electronic enclosures increases, space for peripheral components such as interface modules (e.g., input devices and displays) has grown smaller and more limited. In order to accommodate an interface module, it has to be positioned in front of the blade slots. With the interface modules in front of the blades slots, however, it is not feasible to have a protective sheet metal structure surrounding the interface module, leaving it vulnerable to damage during shipping/handling.

In previous designs, interface modules are mounted in front of the power supplies. The display slides from side to side to offer access to the power supplies. The interface device is protected from damage by a sheet metal structure at the top and bottom of the interface device. However, the middle of the interface device (e.g., the display portion) is still susceptible to damage during shipping/handling and installation of the product into the rack environment.

DETAILED DESCRIPTION

An ejectable/retractable interface module or device is disclosed for use in computer systems where an integrated management module may need an interface for displaying information and retrieving input from a user outside of the user's normal interactions with the servers in the enclosure. The interface device may be used with any type of enclosure where user input is required through less than a full function high-end display, keyboard, and/or mouse.

In exemplary embodiments, the display rotates out of the way of the blade slots to provide access. To prevent thermal issues with the server blades, the interface device is positioned far enough in front of the blades to allow for proper airflow. To avoid potential damage, the interface device retracts into the blade enclosure during shipping/handling.

For purposes of illustration, the apparatus is described herein primarily with reference to use in a rack system or blade environment. Rack systems are well understood in the computer arts. Briefly, however, exemplary rack systems may include a plurality of chassis or blade enclosures mounted within a housing. The blade enclosures may be any suitable size and may be manufactured of any suitable material, such as, e.g., a plastic or metal enclosure suitable for mounting in the housing of the rack system.

Each blade enclosure may house electronic and other electronic devices. For example, the blade enclosures may house a PC board including one or more processing units or processors and other devices and components mounted to, connected to, or positioned near the PC board. For example, rack mount servers may include data storage devices (e.g., hard disk drives, compact disc (CD) or digital versatile disc (DVD) drives, etc.) and operate in a communications network, and therefore include suitable network connection interface(s). Still other devices and components may also be mounted on or otherwise connected to the PC board, as is readily apparent to one having ordinary skill in the computer and electronic arts.

Before continuing, it is noted that the apparatus is not limited to use with any particular type, number, or configuration of rack system, blade enclosure, computer, or other electronic device. Furthermore, although described herein primarily with reference to use in a blade environment, it is noted that this is merely an illustrative environment and the interface device is not limited to such application. The apparatus can be used with any of a wide variety of systems now known or later developed, as will be readily apparent to those having ordinary skill in the art after becoming familiar with the teachings herein.

Figure 1:
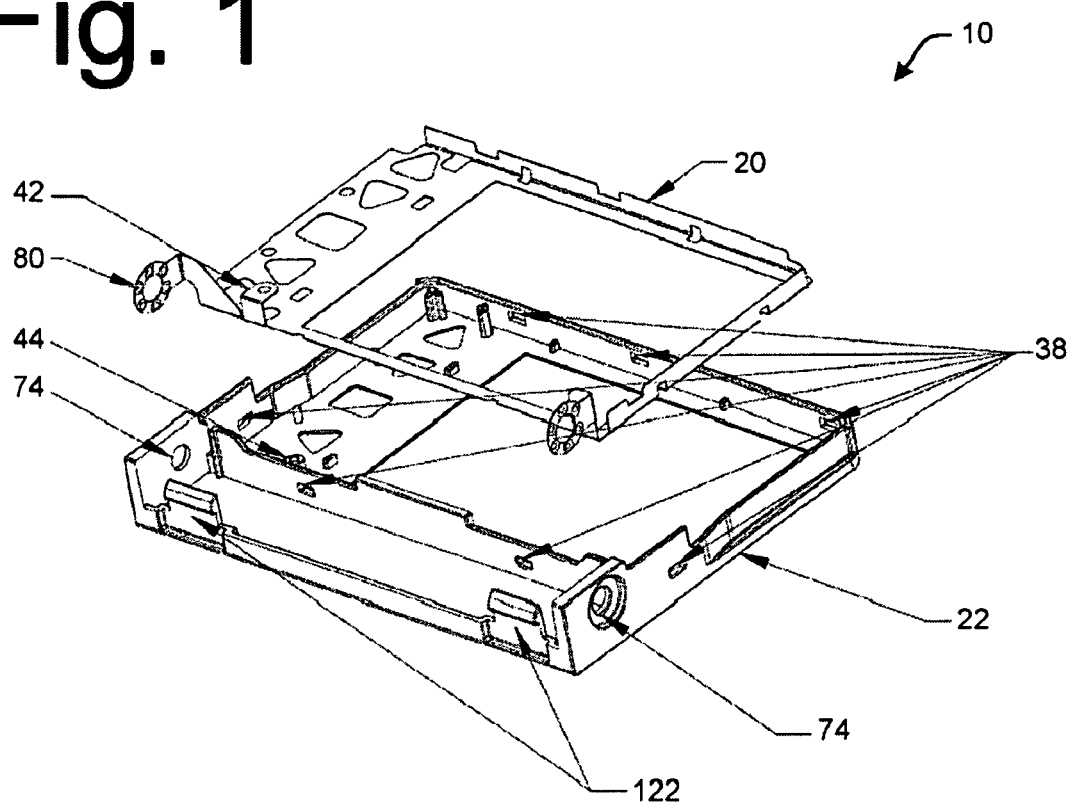
FIG. 1 is a perspective view of an exemplary grounding shield assembly and front cover of an ejectable/retractable interface device.
Figure 2:
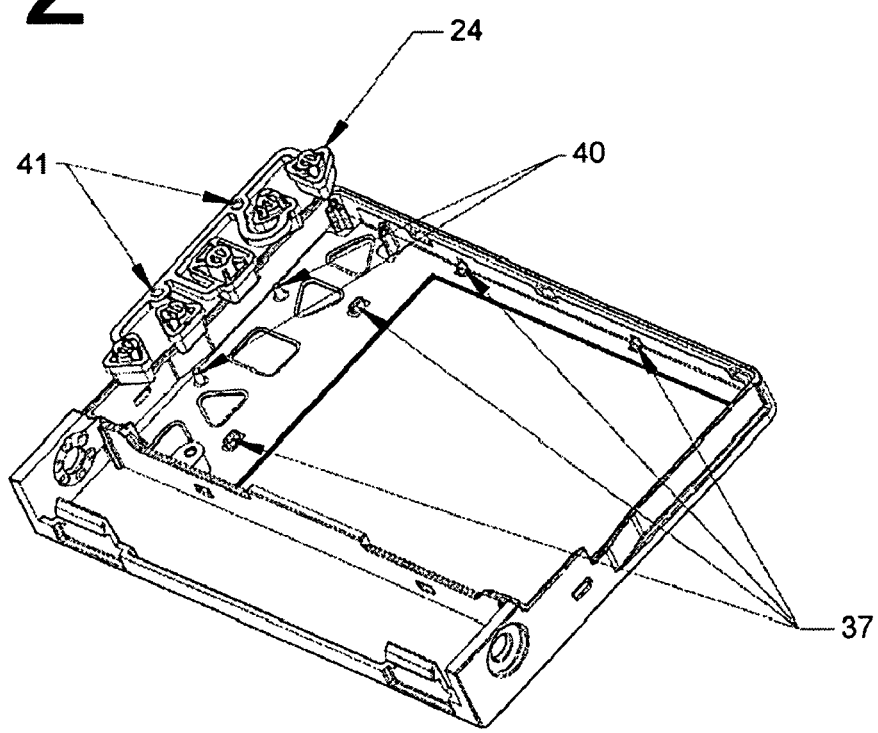
FIG. 2 is a perspective view of an exemplary interface button part assembly for the ejectable/retractable interface device.
Figure 3:
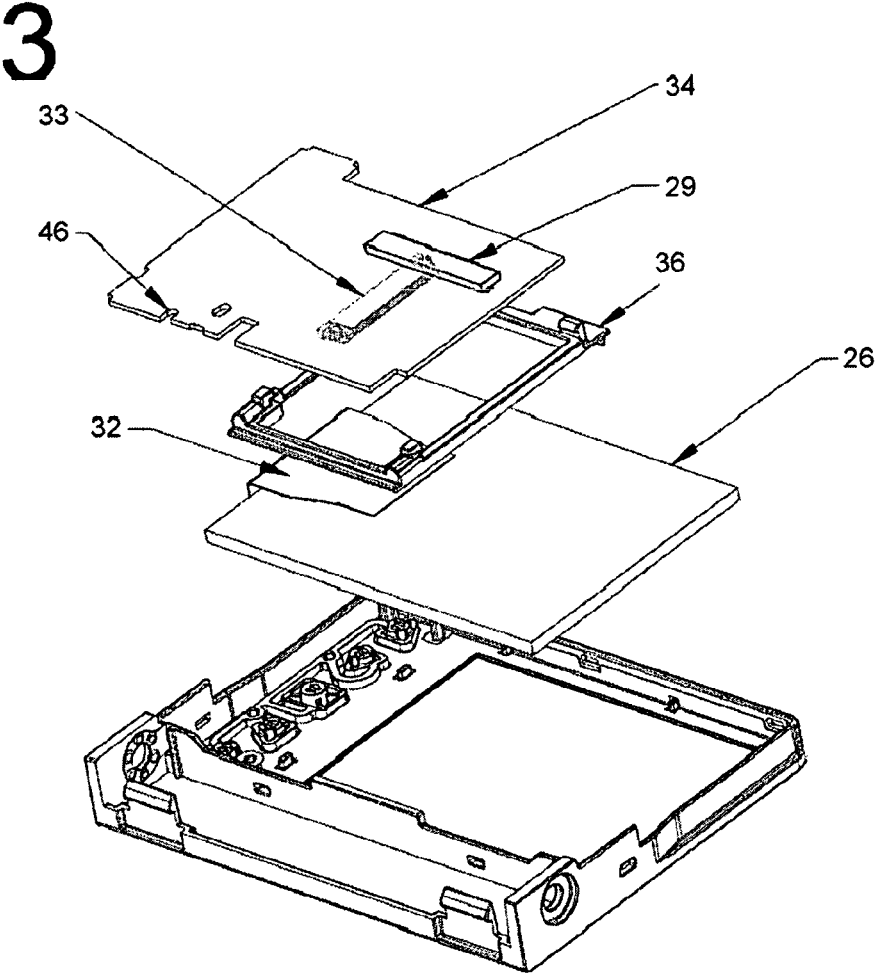
FIG. 3 is a pulled-apart perspective view of an exemplary display and interface assembly for the ejectable/retractable interface device.
Figure 4:
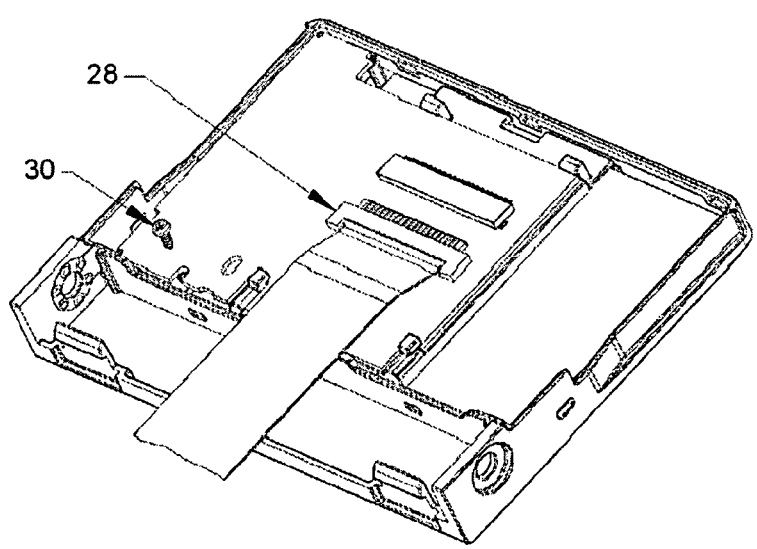
FIG. 4 is a perspective view of an exemplary management data transfer cable and mounting screw assembly for the ejectable/retractable interface device.

FIG. 1 is a perspective view of an exemplary grounding shield assembly 20 and front cover 22 of an ejectable/retractable interface device 10. FIG. 2 is a perspective view of an exemplary interface button part assembly 24 for the ejectable/retractable interface device 10. FIG. 3 is a pulled-apart perspective view of an exemplary display 26 and interface assembly for the ejectable/retractable interface device 10. FIG. 4 is a perspective view of an exemplary management data transfer cable 28 and mounting screw assembly for the ejectable/retractable interface device 10.

The interface module 10 includes a plastic front cover 22, an electro-static discharge (ESD) ground shield 20, a plastic interface button part assembly 24, an LCD screen 26 with data cable 32, an interface PCA 34, a plastic LCD/PCA coupler 36, and a management data transfer cable 28. The ESD ground shield 20 may be assembled in the plastic front cover 22. There are plastic ribs 37 in the plastic front cover 22 that engage cut outs 38 in the ESD grounding shield 20 that help position the ESD grounding shield 20.

The plastic front cover 22 is equipped with two heat stake assembly posts 40 that are used to position and retain the plastic interface button part 24. The plastic interface button part 24 has two receiving holes 41, which the heat stake assembly posts 40 slide through during assembly. Once the plastic interface button part 24 is assembled in the plastic front cover 22, a heat staking process is used for permanently mounting the plastic interface button part 24.

The LCD screen 26, interface PCA 34 and plastic LCD/PCA coupler 36 may be assembled next. The LCD screen 26 is connected to the interface PCA 34 by inserting the LCD data cable 32 into a mating connector 33 on the interface PCA 34. This assembly is then lowered into the plastic front cover 22. There are plastic guide features in the plastic front cover 22 that help align the LCD/PCA assembly 34 in the plastic front cover 22. Once the LCD/PCA assembly 34 is installed, the plastic LCD/PCA coupler 36 is positioned between the LCD screen 26 and the interface PCA 34 to provide additional support and alignment for the interface PCA 34.

When the interface PCA 34 is assembled into the plastic front cover 22, electrical switches on the interface PCA 34 line up with the plastic interface button part 24. The user can press the plastic interface button part 24 to actuate the electrical switches on the interface PCA. To ground the interface PCA, an L-shaped flange 42 with a screw hole on the top surface bent out of the ESD grounding shield 20. The screw hole in the L-shape flange 42 is positioned over a plastic screw boss 44 that protrudes from the plastic front cover 22. A slot 46 in the interface PCA 34 allows an assembly screw 30 to be assembled through the interface PCA 34, through the screw hole in ESD grounding shield 20 and into the plastic screw boss 44. The interface PCA 34 has a ground pad that touches the top surface of the L-shape flange 42 of ESD grounding shield 20 that helps ground the interface PCA 34. The management data transfer cable 28 is plugged into a mating connector 29 located on the interface PCA 34 and routed down through an opening in the plastic front cover 22. The plastic rear cover can be installed next.

Figure 5:
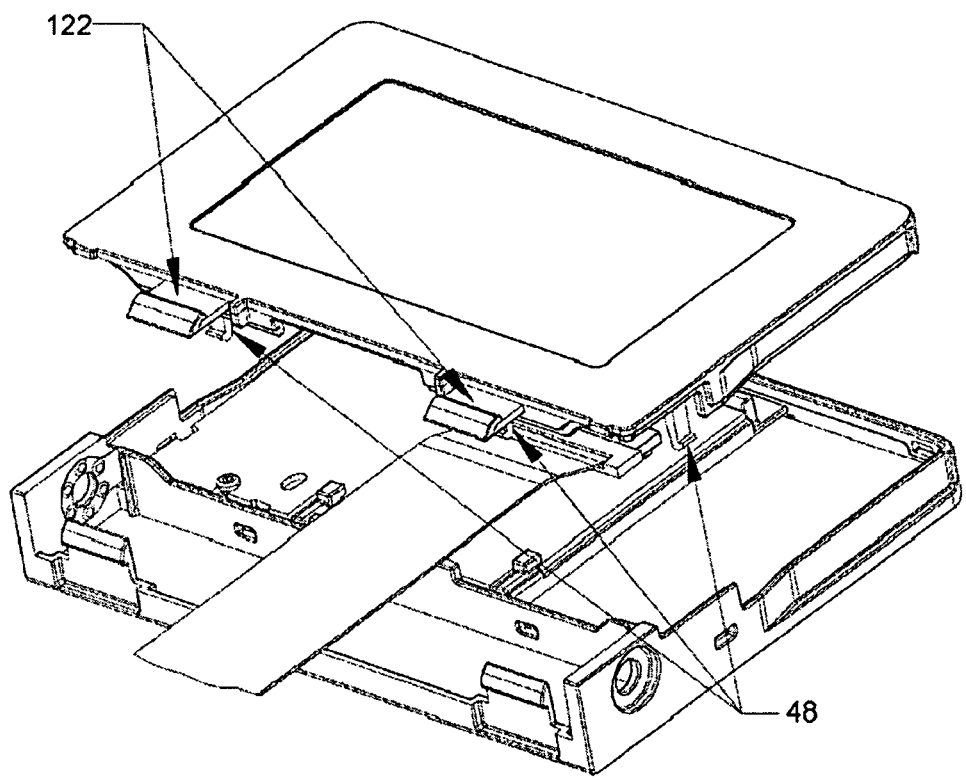
FIG. 5 is a pulled-apart perspective view of an exemplary rear cover assembly for the ejectable/retractable interface device.

FIG. 5 is a pulled-apart perspective view of an exemplary rear cover assembly for the ejectable/retractable interface device 10. The plastic rear cover is equipped with plastic snaps 48 that engage snap cutouts in the plastic front cover 22 to hold the LCD module assembly together. Additionally, there are features in the plastic rear cover that support and retain the LCD screen 26 and interface PCA 34 in the correct position.

Figure 6:
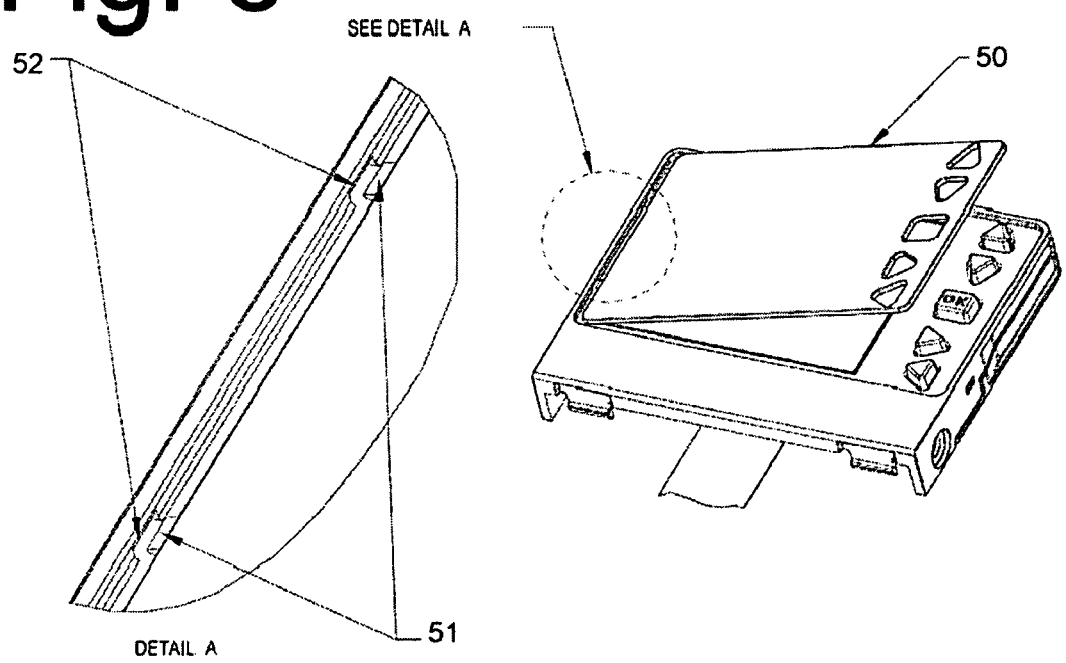
FIG. 6 is a perspective view illustrating assembly of an exemplary lens for the ejectable/retractable interface device.
Figure 7:
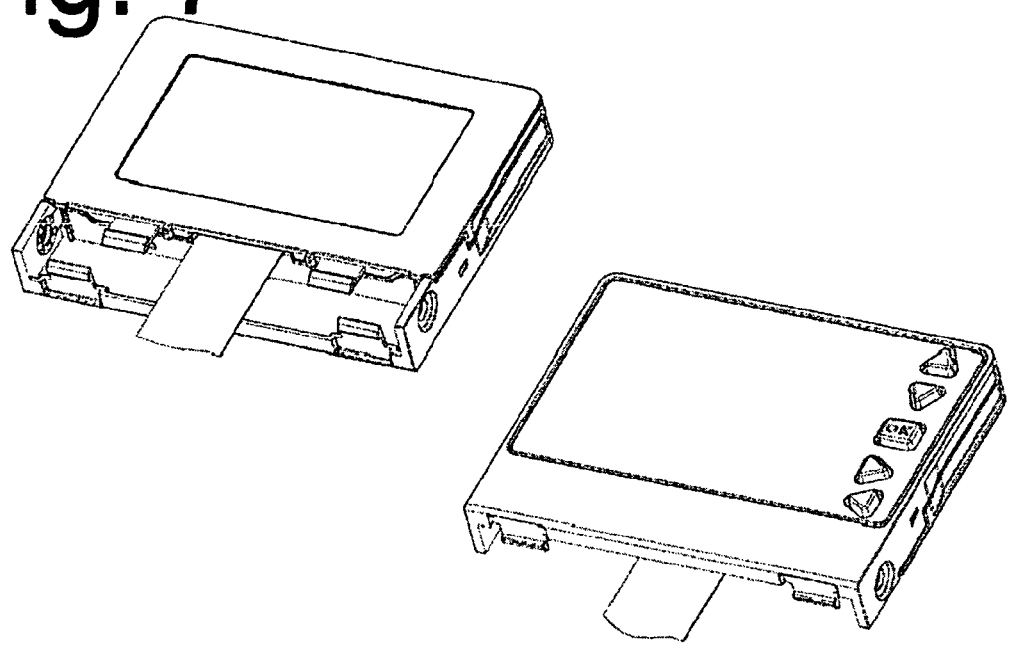
FIG. 7 are perspective views showing the exemplary lens assembled on the ejectable/retractable interface device.

FIG. 6 is a perspective view illustrating assembly of an exemplary lens 50 for the ejectable/retractable interface device 10. The LCD lens 50 is installed in the plastic front cover 22 to protect the LCD screen 26. The plastic front cover 22 has a lens recess that is used for placement of the LCD lens 50. The LCD lens 50 has two hooks 51 on one side that engage cutouts 52 in the lens recess on the plastic front cover, as can be seen in the detail view A in FIG. 6. The LCD lens hooks 51 are inserted into these cut outs 52 and then rotated down into the recess. The LCD lens 50 may be held in place with adhesive. FIG. 7 are perspective views showing the exemplary lens assembled on the ejectable/retractable interface device 10.

Figure 8:
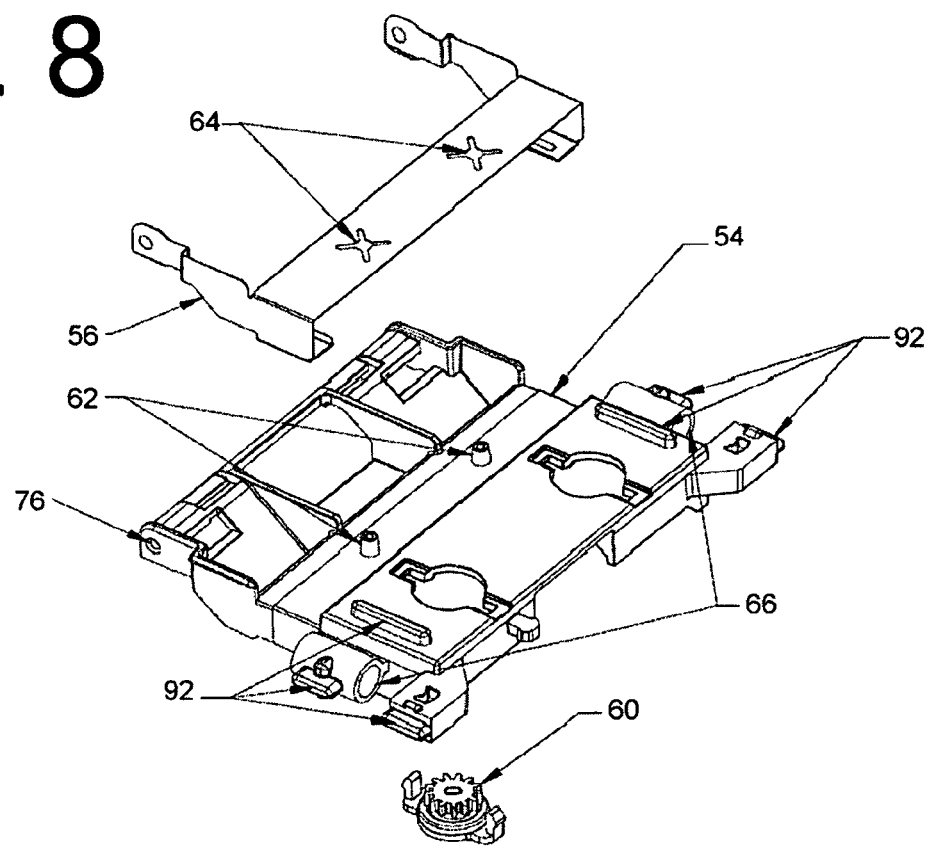
FIG. 8 is a pulled-apart perspective view of an exemplary display trolley assembly for the ejectable/retractable interface device.

FIG. 8 is a pulled-apart perspective view of an exemplary display trolley assembly for the ejectable/retractable interface device 10. The display trolley assembly may comprise four components: a plastic display trolley 54, a trolley ESD grounding shield 56, an ejector spring 58 (FIG. 9), and a dampener 60. The plastic display trolley 54 has two conical mounting posts 62 that are used to retain the trolley ESD grounding shield 56. The trolley ESD grounding shield 56 is equipped with two "+" sign shaped cut outs 64 that correspond to the conical mounting post 62 in the plastic display trolley 54. As the trolley ESD grounding shield 56 is lowered on the conical mounting posts 62, the cut outs 64 engage the conical mounting posts 62 and form an interference fit between the trolley ESD grounding shield 56 and the conical mounting post 62. This interference holds the trolley ESD grounding shield 56 firmly to the plastic display trolley 54. An off-the-shelf dampener 60 is then snapped into a cut out in the plastic display trolley 54.

Figure 9:
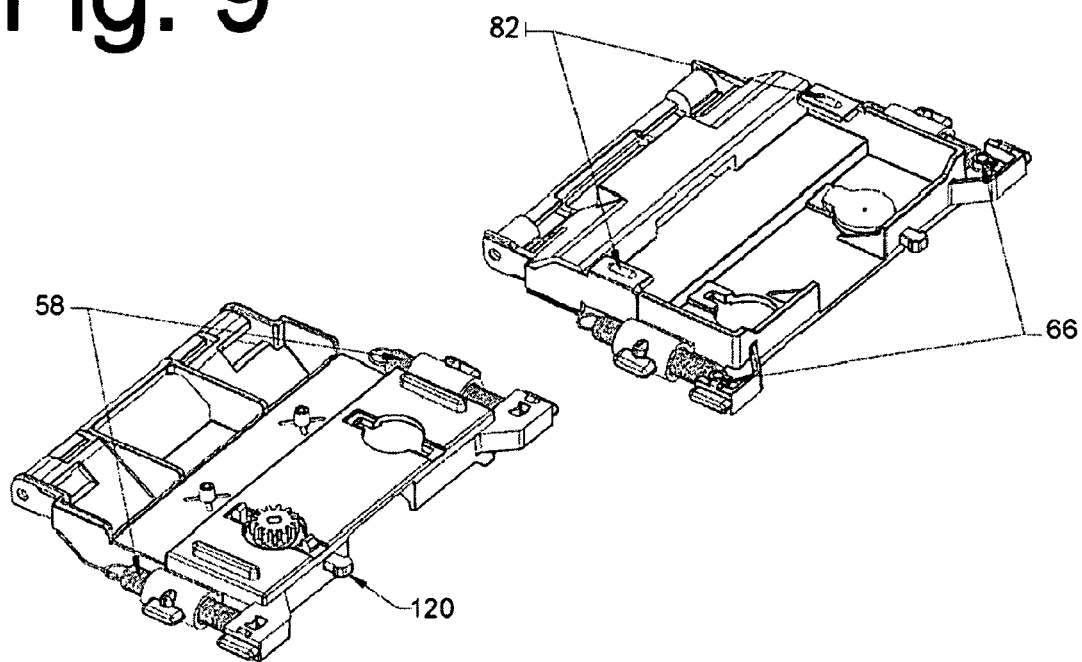
FIG. 9 are top and bottom perspective views of an exemplary display trolley assembly for the ejectable/retractable interface device.

FIG. 9 are top and bottom perspective views of an exemplary display trolley assembly for the ejectable/retractable interface device 10. Two ejector springs 58 are assembled to the plastic ejector trolley 54. The plastic display trolley 54 is outfitted with two spring guide tubes 66 and two ejector spring retention bosses 68 that are molded into the plastic. To assemble the ejector springs 58, the springs 58 are fed through the spring guide tubes 66 in the plastic display trolley 54 and then rotated into position over the ejector spring retention bosses 66.

Figure 10:
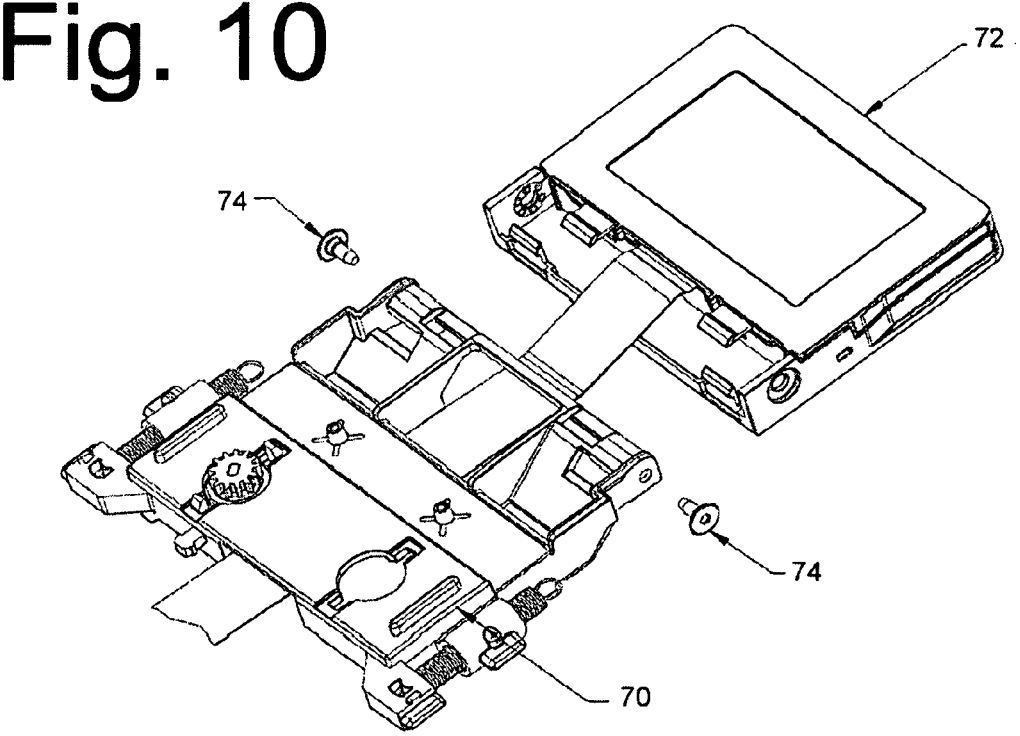
FIG. 10 is a perspective view illustrating coupling of the display trolley assembly and interface device for the ejectable/retractable interface device.

FIG. 10 is a perspective view illustrating coupling of the display trolley assembly 70 for the ejectable/retractable interface device 10. The LCD module 72 is now assembled to the display trolley assembly 70. The plastic front cover 22 of the LCD module has two mounting holes 74 (FIG. 1) that align with two screw bosses 76 (FIG. 8) in the plastic display trolley 54. When the LCD module 72 is properly aligned to the display trolley assembly 70, a shoulder screw 74 is assembled through the mounting holes in the LCD module 72 and screwed in the screw bosses 76 in the plastic display trolley 54.

With the shoulder screws 74 in place, the LCD module 72 has the ability to rotate (e.g., 90 degrees) with respect to the display trolley assembly 70. In an exemplary embodiment, features formed in the plastic front cover 22 and plastic rear cover prevent rotations of greater than 90 degrees.

The shoulder screws 74 not only hold the LCD module 72 to the display trolley assembly 70, but may also ensure that the ESD grounding shield 20 in the LCD module 72 makes continuous contact with the trolley ESD grounding shield 56. Continuous contact may be made as follows. When the ESD grounding shield 20 is installed in the plastic front cover 22, a portion of the ESD grounding shield 20 is positioned over the mounting holes 74 in the plastic front cover 22. Clearance holes are cut in the ESD grounding shield 20 in the LCD module 72 to allow the shoulder screws 74 to pass through. Similarly, when the trolley ESD grounding shield 56 is assembled to the plastic display trolley 54, a portion of the trolley ESD grounding shield 56 is positioned over the screw bosses 76 in the plastic display trolley 54. Again, clearance holes are cut in the trolley ESD grounding shield 56 to allow the shoulder screws 74 to pass through. Dimples 80 (FIG. 1) are formed in the ESD grounding shield 20 in the LCD module 72 around the mounting cutouts so that when the shoulder screws 74 are assembled, these dimples are compressed against the trolley ESD grounding shield 56. This helps ensure that the ESD grounding shield 20 in the LCD module 70 and the trolley ESD grounding shield 56 are always in contact with each other.

To connect the assembly to the chassis, thereby preventing any damage due to ESD, two oblong forms 82 (FIG. 9) may be made on the bottom of the trolley ESD grounding shield 56. These oblong forms 82 are in continuous contact with the bottom of the sheet metal portion of the management module 102, providing a ground for the display assembly 70.

Figure 11:
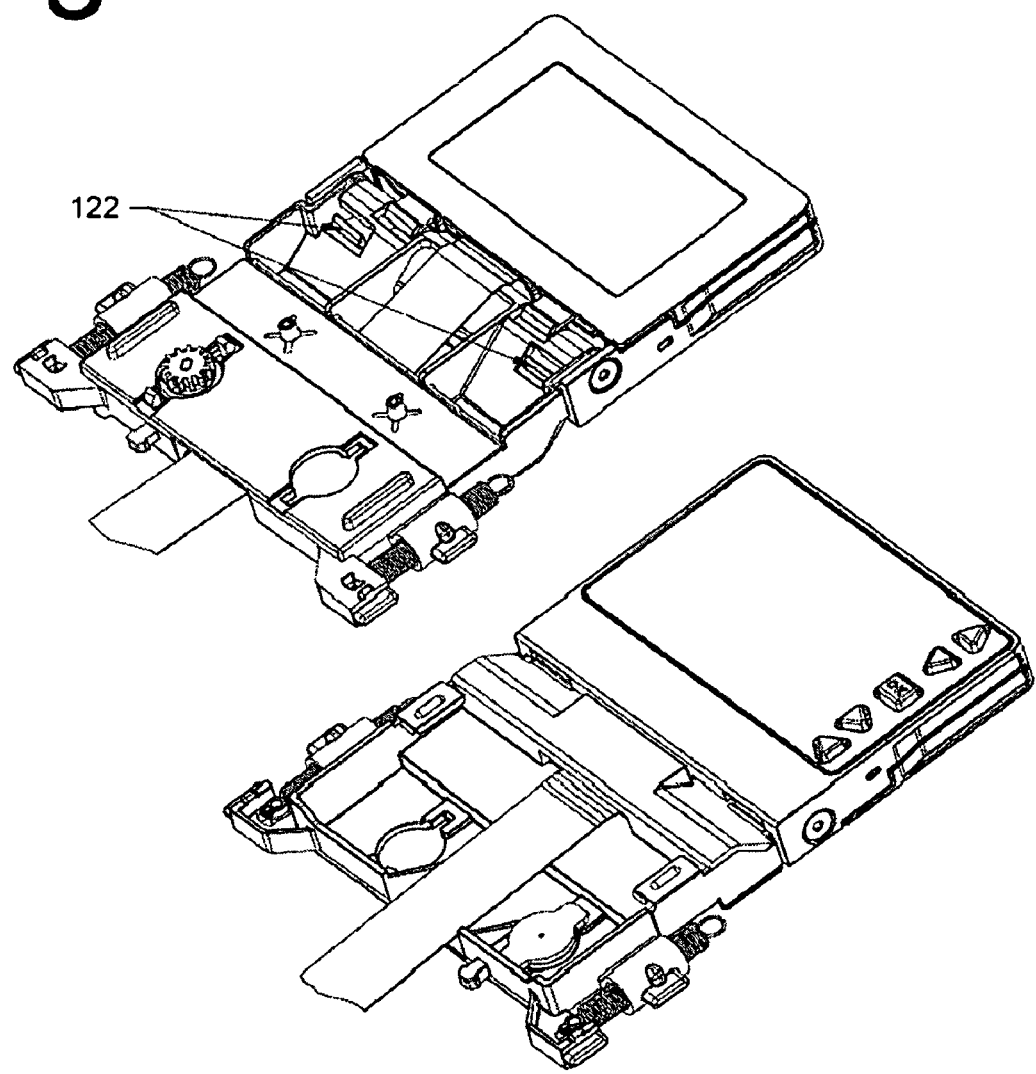
FIG. 11 are perspective views showing the display trolley assembled for the ejectable/retractable interface device.

After the LCD module 72 is attached to the display trolley assembly 70, the management data transfer cable 28 may be routed through cable clearance holes in the plastic display trolley 54. FIG. 11 are perspective views showing the display trolley assembled for the ejectable/retractable interface device. To complete assembly of the ejectable/retractable interface device 10, the coupled display trolley assembly 70 and LCD module 72 is assembled to the display carrier tray.

Figure 12:
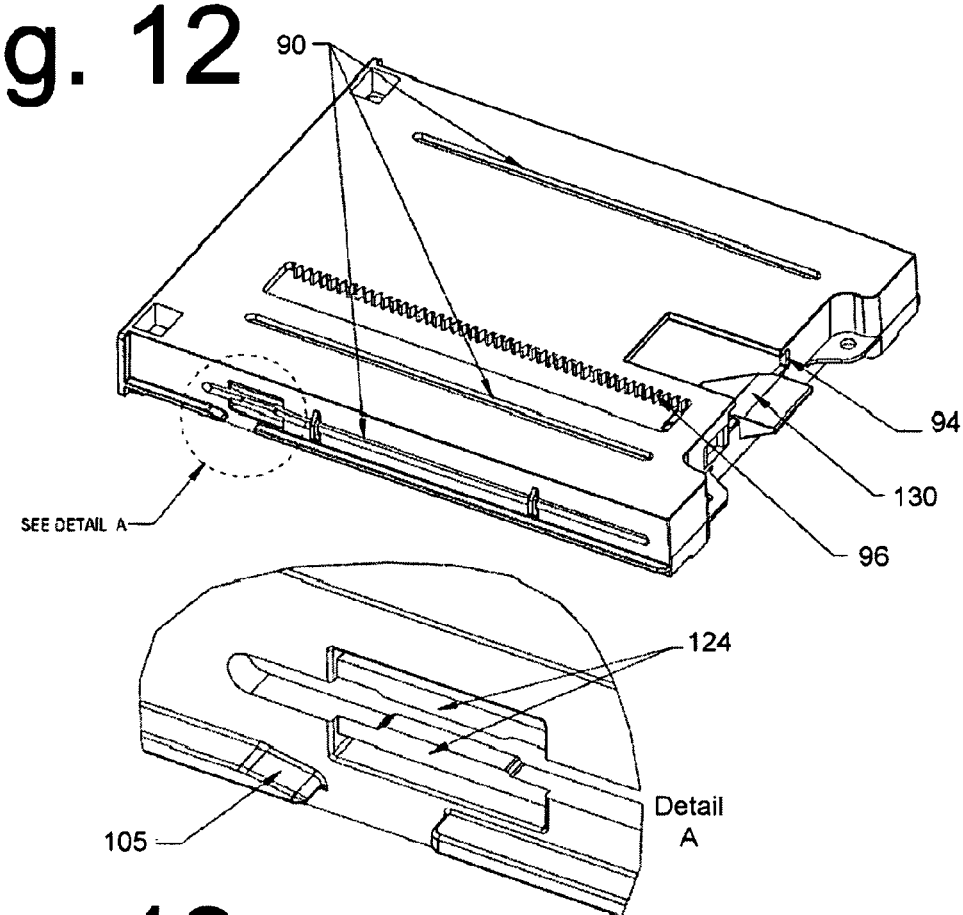
FIG. 12 is a perspective view of an exemplary display carrier tray for the ejectable/retractable interface device.
Figure 13:
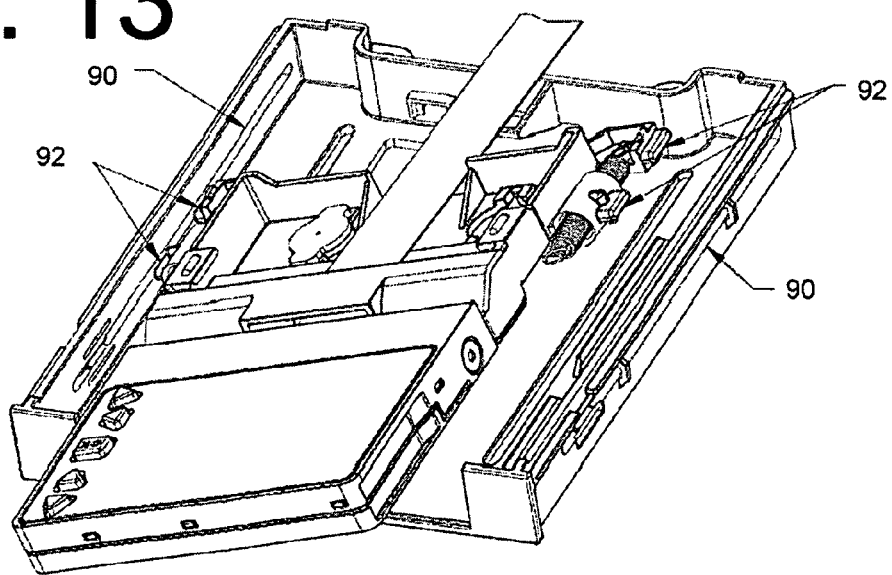
FIG. 13 is a perspective view illustrating assembly of the display trolley assembly into the display carrier tray for the ejectable/retractable interface device.

FIG. 12 is a perspective view of an exemplary display carrier tray for the ejectable/retractable interface device 10. FIG. 13 is a perspective view illustrating assembly of the display trolley assembly into the display carrier tray for the ejectable/retractable interface device. The display carrier tray is equipped with four guide slots 90, two on the top of the part and one on each side of the part, that are used to retain and guide the coupled display trolley assembly 70 and LCD module 72 during the ejection and retraction process. The plastic display trolley 70 is equipped with six guide protrusions 92, two on the top of the part and two on each side of the part, which fit into the guide slots 90 in the display carrier tray. Before installing the coupled display trolley assembly 70 and LCD module 72, the management data transfer cable 28 is fed through the cable slot 94 at the rear of the display carrier tray.

To install the coupled display trolley assembly 70 and LCD module 72, two of the guide protrusions 92 on one side of the plastic display trolley 54 are toed into one of the side guide slots 90 in the display carrier tray and then rotated down until the guide protrusions 92 on the opposite side of the plastic display trolley snap into the guide slot 90 on the opposite side of the display carrier tray. The two guide protrusions 92 on the top of the plastic display trolley slide through the guide slots 90 in the top of the display carrier tray during this rotation process.

The display carrier tray is also equipped with a gear rack 96 that engages the dampener 60 (FIG. 8) in the display trolley assembly 70 during the installation process. The dampener 60 is used to control the speed with which the coupled display trolley assembly 70 and LCD module 72 exit the display carrier tray during the ejection process. With the coupled display trolley assembly 70 and LCD module 72 assembled into the display carrier tray, the two ejector springs 58 (FIG. 9) are assembled to two ejector spring retention bosses 66 in the display carrier tray in the same manner they were assembled to the plastic display trolley.

Figure 14:
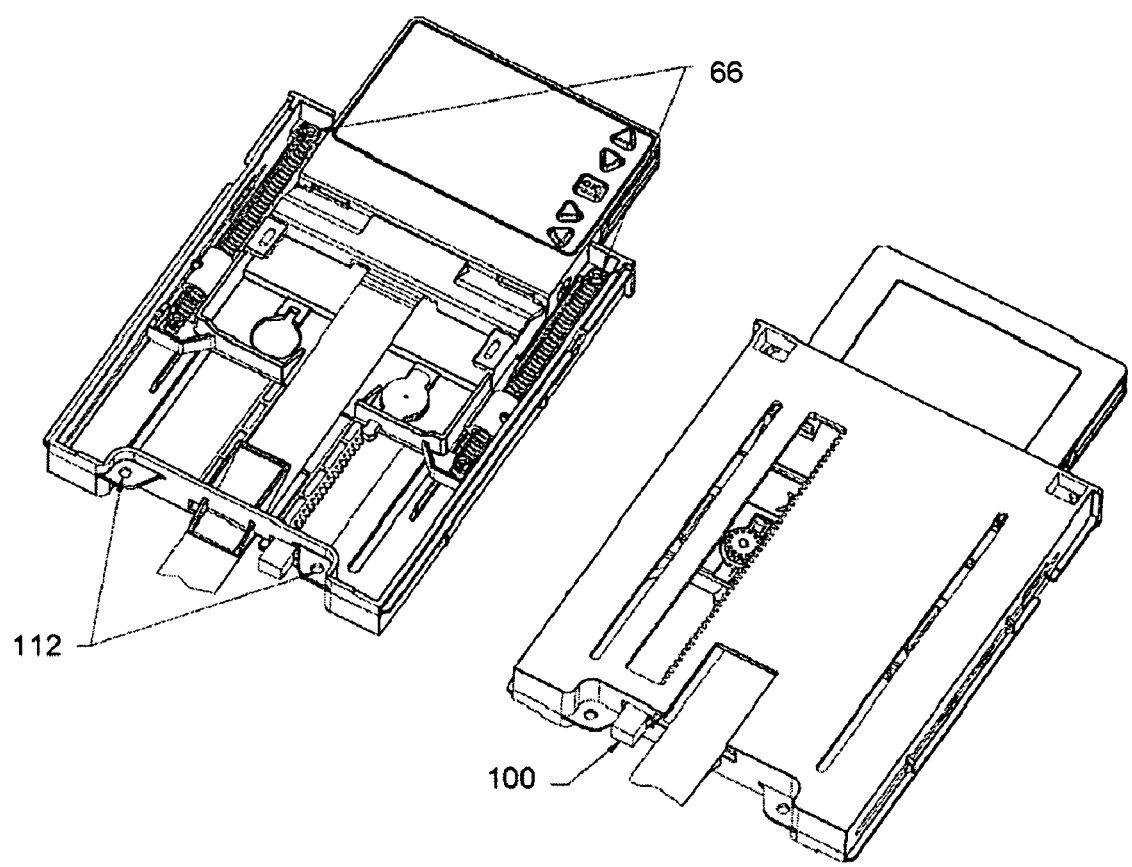
FIG. 14 are top and bottom perspective views showing the display trolley and interface device assembled in the display carrier tray of the ejectable/retractable interface device.

FIG. 14 are top and bottom perspective views showing the display trolley assembled in the display carrier tray of the ejectable/retractable interface device 10. To complete the assembly, a push/push latch 100 may be snapped into a cut out in the display carrier tray.

Figure 15:
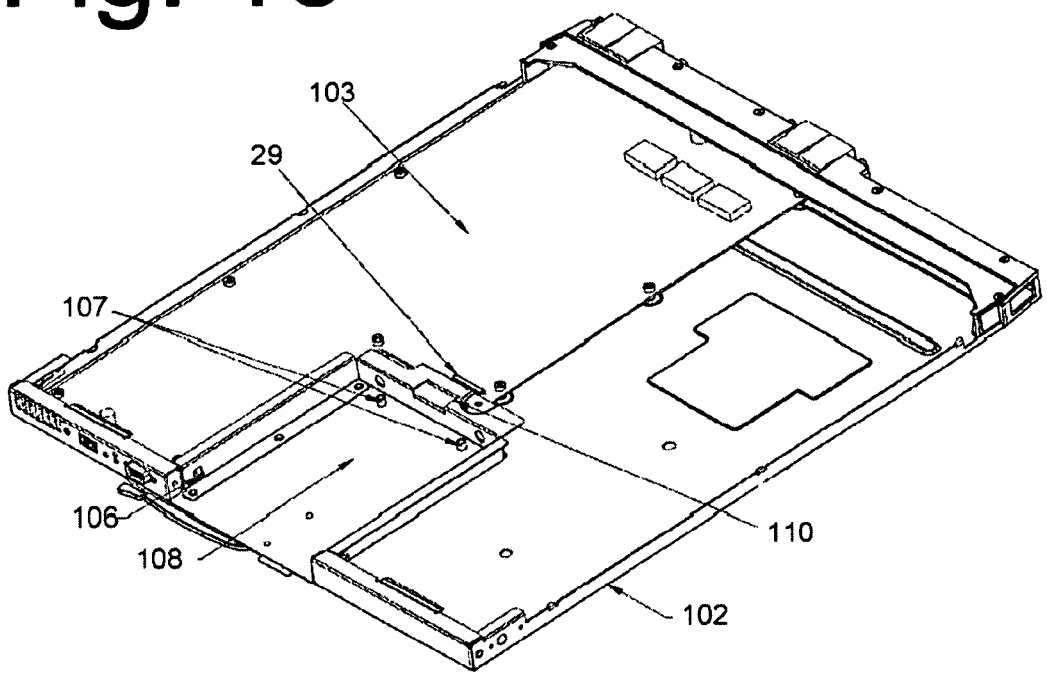
FIG. 15 is a perspective view of an exemplary management module for the ejectable/retractable interface device.
Figure 16:
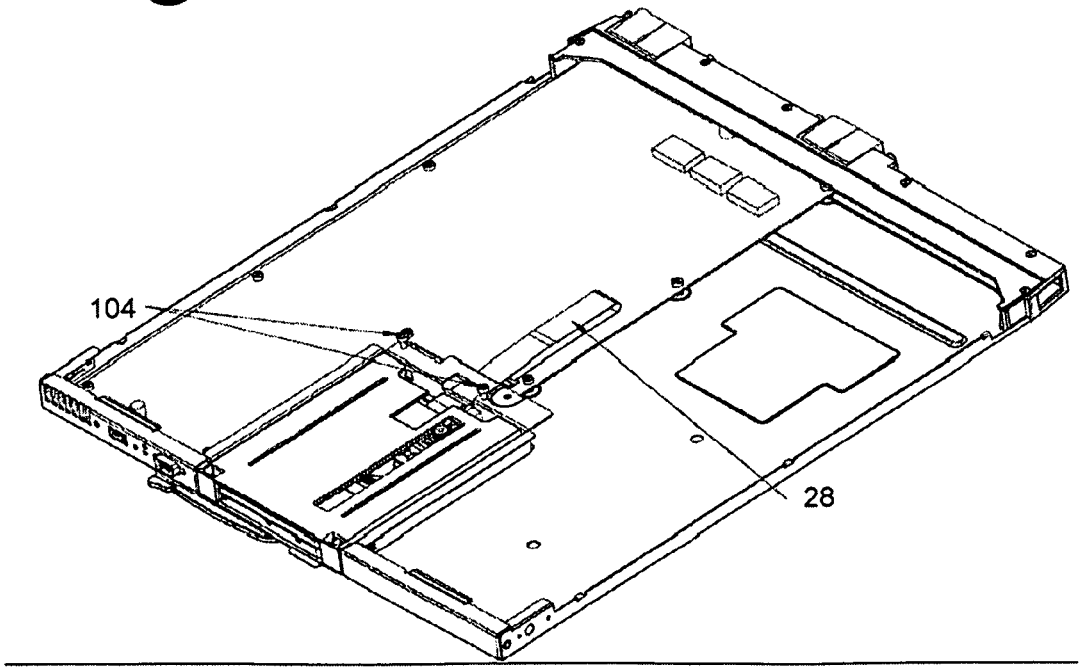
FIG. 16 is a perspective view showing the interface device installed in the management module of the ejectable/retractable interface device.

FIG. 15 is a perspective view of an exemplary management module 102 for the ejectable/retractable interface device 10. FIG. 16 is a perspective view showing the display module installed in the management module 102 of the ejectable/retractable interface device. The ejectable/retractable input interface device 10 is housed in the management module 102 for the blade enclosure. The interface device 10 is retained in the enclosure management module 102 by two retaining screws 104 and two metal retaining forms 106 in the management module 102.

To install the interface device 10 into the enclosure management module 102, the interface device 10 may be lowered into the interface device mounting area 108. As the interface device 10 is lowered, the two retaining forms 106 pass through cuts in the interface device. Once the interface device 10 contacts the floor of the enclosure management module 102, the interface device 10 may be pushed toward the rear of the enclosure management module 102. As the interface device 102 slides toward the rear of the enclosure management module 102, the two retaining forms 106 engage features at the front of the interface device 10 to help hold the front of the interface device 10 to the enclosure management module 102. To facilitate assembly, ramps 105 (detail area A in FIG. 12) may be provided in the interface device 10 that act as a lead-in for the two retaining forms 106 as they engage the interface device 10.

As the interface device 10 slides into place, the management data transfer cable 28 is fed through an opening 110 at the rear of the interface device mounting area 108. When the interface device 10 reaches its full range of travel, the management data transfer cable 28 may be looped around and plugged into a connector 29 on the management module PCA 103.

The enclosure management module 102 has two threaded stand-offs 107 located at the rear of the display mounting area 108 in the enclosure management module 102 that are used to secure the interface device 10 to the enclosure management module 102. The interface device 10 in turn has two mounting holes 112 (FIG. 14) that correspond to the threaded stand-offs 107 in the enclosure management module 102. Two screws 104 are installed through these mounting holes 112 to secure the interface device 10 to the enclosure management module 102.

Figure 17:
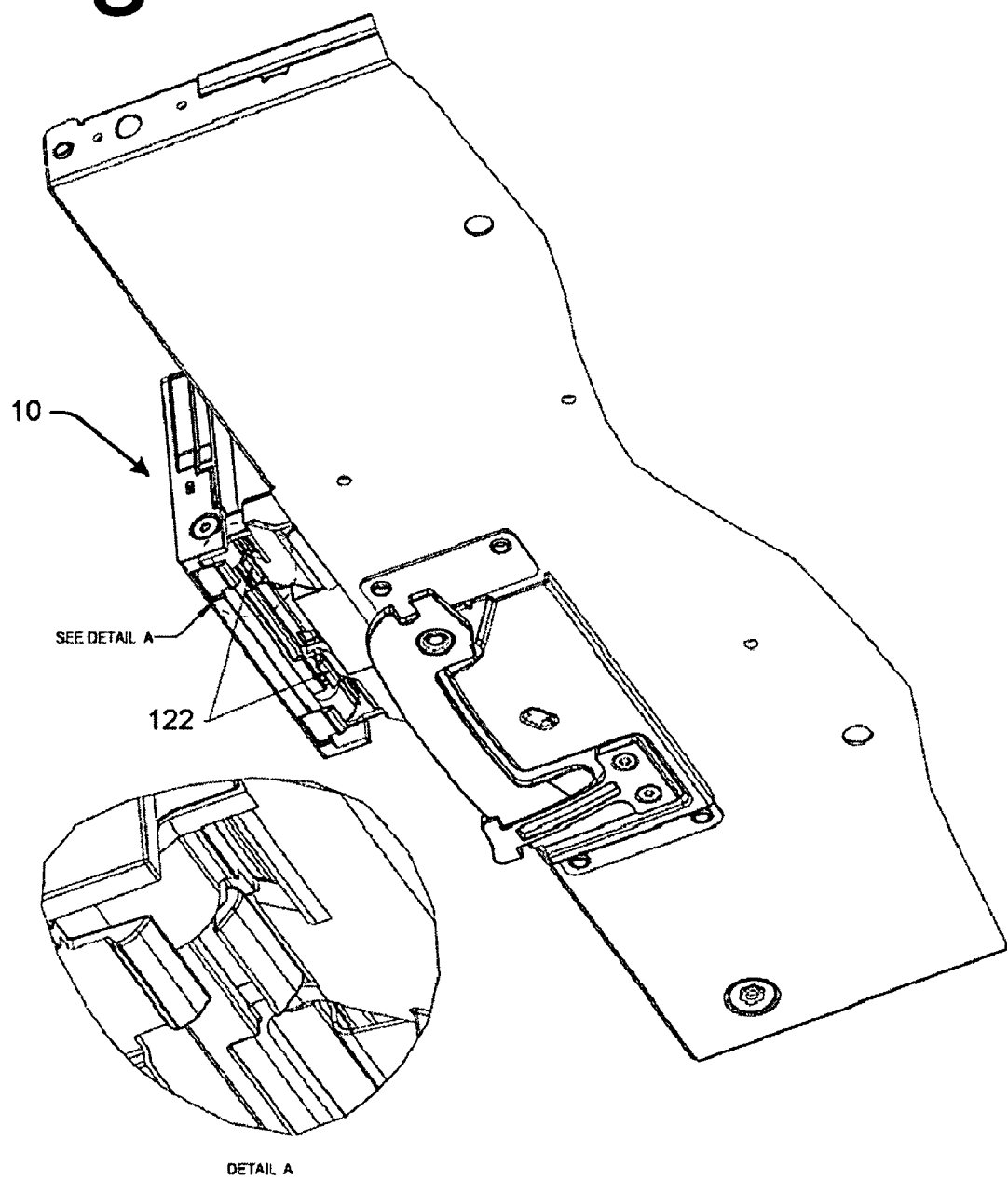
FIG. 17 is a perspective view illustrating the rear cover snap-locked into locking receptacles in the display trolley of the ejectable/retractable interface device.
Figure 18:
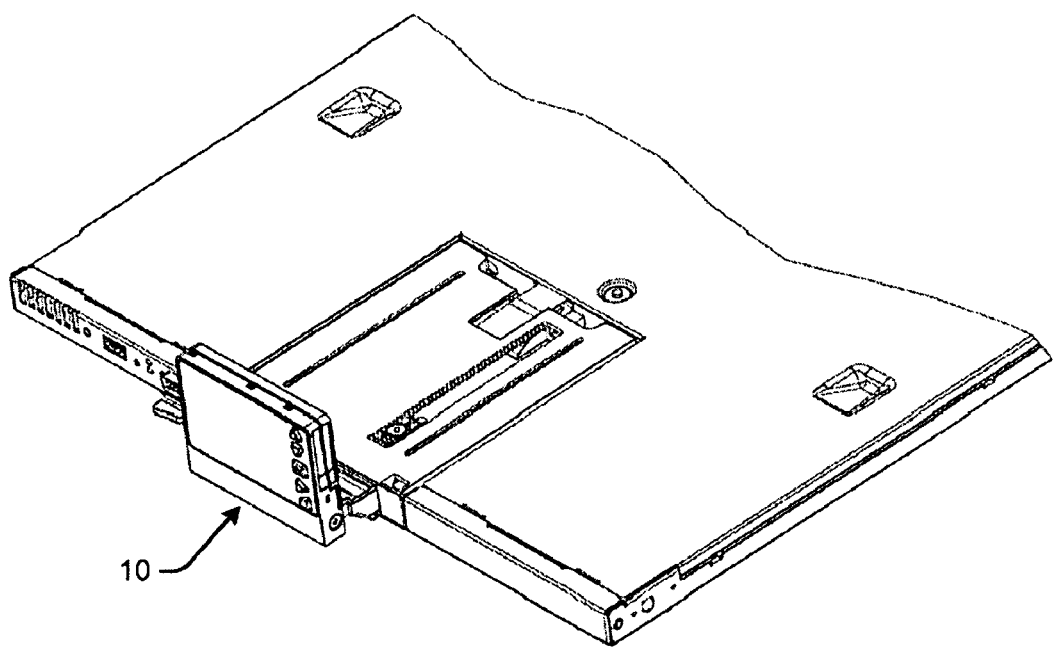
FIG. 18 is a perspective view showing the input interface device ejected and rotated into a viewing position for the ejectable/retractable interface device.

Assembly of the ejectable/retractable input interface device 10 is now complete, and may be operated as follows. FIG. 17 is a perspective view illustrating the rear cover snap-locked into locking receptacles in the display trolley of the ejectable/retractable interface device 10. FIG. 18 is a perspective view showing the interface device module 10 ejected and rotated into a viewing position.

The coupled display trolley assembly 70 and LCD module 72 may be locked into a retracted position when a locking feature 120 (FIG. 9) that is molded into the plastic display trolley 54 engages a push/push latch. In the retracted position, the LCD module 72 is rotated so that it is parallel to the display trolley assembly 70. Snap features 122 (FIG. 17) in the plastic front cover 22 engage cutouts in the plastic display trolley 54 to lock the LCD module 72 into this position.

When the coupled display trolley assembly 70 and LCD module 72 is in the retracted position, the ejection springs 66 are extended (see FIG. 14). To release the coupled display trolley assembly 70 and LCD module 72, the user pushes the top of the LCD module 72. This action causes the locking feature on the plastic display trolley 54 to disengage the lock in the push/push latch. Now that the coupled display trolley assembly 70 and LCD module 72 is no longer locked in position, the extended ejection springs 66 compress, pulling the coupled display trolley assembly 70 and LCD module 72 out of the display carrier tray. Towards the end of the ejection process, the guide protrusions on the sides of the plastic display trolley contact locking protrusions 124 in the guide slots of the display carrier tray.

At this point, the user may pull the coupled display trolley assembly 70 and LCD module 72 past these locking protrusions 124. The locking protrusions 124 may be designed so that when sufficient force is applied, the locking protrusions 124 flex out of the way to allow the guide protrusions 92 in the plastic display trolley 54 to pass through. After the guide protrusions 92 in the plastic display trolley 54 clear the locking protrusions 124, the locking protrusions 124 flex back to their normal position. Once the guide protrusions 92 clear the locking protrusions 124 in the display carrier tray, they reach the end of the guide slots in the display carrier tray. This effectively locks the coupled display trolley assembly 70 and LCD module 72 in position. This lock helps ensure that the coupled display trolley assembly 70 and LCD module 72 does not slide back into the display carrier tray when a user interacts with the input interface device.

With the coupled display trolley assembly 70 and LCD module 72 fully ejected, the user may then rotate the LCD module 72 up to about 90 degrees into viewing position. Plastic snaps 17 on the plastic rear cover engage cutouts in the plastic display trolley 54 to lock the LCD module 72 in the 90 degree position. To retract the input interface device 10, the above-described steps may be reversed. The steps are not repeated here for sake of brevity.

During the ejection and retraction process, the service loop in the management data transfer cable 28 allows the cable to be pulled out and pushed in with the coupled display trolley assembly 70 and LCD module 72. To help ensure that management data transfer cable 28 does not flex improperly, a stiffener may be added to the bottom side of the management data transfer cable 28 to increase its strength. In addition, a cable ramp 130 (FIG. 12) may be molded into the display carrier tray just below the cable slot 94 to help guide the management data transfer cable 28 during ejection and retraction. The combination of these features helps prevent the management data transfer cable 28 from binding during the ejection/retraction process.

It will be readily appreciated that the input interface device 10 can be entirely concealed in the blade enclosure during the shipping process. This reduces or altogether eliminates the possibility of damaging the interface device 10 during shipping. In addition, installation of the blade enclosure in the rack presents another opportunity for the interface device 10 to experience potential damage, but with this design, the interface device 10 can be concealed during the installation of the blade enclosure in the rack. The interface device 10 is also contained within the management module 102 for the blade enclosure. Accordingly, connecting the interface device 10 to the enclosure is easier because the installer does not have to route the data transfer cable 28 from the front of the enclosure all the way to the rear of the enclosure.

It is noted that the exemplary embodiments discussed above are provided for purposes of illustration. Still other embodiments are also contemplated. It is also noted that, although the systems and methods are described with reference to rack systems, in other exemplary embodiments, the apparatus may be implemented for other electronic devices, such as, a collection of peripheral devices for computers, video and audio equipment, etc.

The exemplary embodiments shown and described are provided for purposes of illustration and are not intended to be limiting. Still other embodiments are also contemplated.

The invention claimed is:

1. An ejectable/retractable interface module for a computer system, comprising:
  a display trolley assembly;
  a display module pivotally connected to the display trolley assembly, the display module having a locking feature;
  a management cable connecting the display module to a computer board in the display trolley assembly;
  wherein the display trolley assembly and display module are configured for during ejection and retraction in a blade enclosure so that the display module folds flat and retracts into the blade enclosure to reduce damage during shipping; and
  wherein the display module pivots to a desired viewing angle during use.

2. The interface module of claim 1, wherein the locking feature maintains the display module at the desired viewing angle during use.

3. The interface module of claim 1, wherein the locking feature maintains the display module folded flat.

4. The interface module of claim 1, further comprising a service loop in the management cable so that the management cable can be pulled out and pushed in with the display trolley assembly and display module.

5. The interface module of claim 1, further comprising a stiffener on the management cable to reduce improper flexure.

6. The interface module of claim 1, further comprising a cable ramp to guide the management cable during ejection and retraction.

7. The interface module of claim 1, further comprising at least one ejector spring to eject the display trolley assembly and display module.

8. The interface module of claim 1, further comprising a gear rack and dampener to control speed with which the display trolley assembly and display module exit a display carrier tray during ejection.

9. The interface module of claim 1, wherein the management cable is fed through a cable slot at a rear of a display carrier tray so that the management cable need not be routed from a front of the blade enclosure to a rear of the blade enclosure during setup.

10. The interface module of claim 1, further comprising an ESD grounding shield.

11. A method comprising:
  pivotally connecting a display module to a display trolley assembly;
  providing a management cable between the display module to a computer board in the display trolley assembly;
  controlling speed of the display trolley assembly and display module exiting a display carrier tray during ejection; and
  wherein the display module folds flat and retracts into the blade enclosure to reduce damage during shipping, and the display module pivots to a desired viewing angle during use.

12. The method of claim 11, further comprising locking the display module at the desired viewing angle during use.

13. The method of claim 11, further comprising locking the display module in a folded flat position.

14. The method of claim 11, further comprising providing a service loop in the management cable so that the management cable can be pulled out and pushed in with the display trolley assembly and display module.

15. The method of claim 11, further comprising guiding the management cable during ejection and retraction.

16. An apparatus comprising:
   means for pivotally connecting a display module to a display trolley assembly;
   means for providing a management cable between the display module to a computer board in the display trolley assembly;
   means for folding the display module to retract into a blade enclosure to reduce damage during shipping;
   means for pivoting the display module to a desired viewing angle during use; and
   means for controlling speed of the display trolley assembly and display module.

17. The apparatus of claim 16, wherein the means for controlling speed of the display trolley assembly and display module is operable during ejection.

18. The apparatus of claim 16, further comprising means for locking the display module in a folded flat position.

19. The apparatus of claim 16, further comprising means for locking the display module at the desired viewing angle during use.

* * * * *